United States Patent [19]
Mitchell

[11] Patent Number: 4,982,308
[45] Date of Patent: Jan. 1, 1991

[54] CAPACITORS

[75] Inventor: Alistair Mitchell, Brookvale, Australia

[73] Assignee: Marconi Electronic Devices Limited, England

[21] Appl. No.: 230,871

[22] Filed: Aug. 10, 1988

[30] Foreign Application Priority Data

Aug. 24, 1987 [GB] United Kingdom ............... 8719957

[51] Int. Cl.$^5$ .................. H01G 4/06; H01G 7/00; G08C 5/00
[52] U.S. Cl. .................................. 361/313; 29/25.42; 430/319
[58] Field of Search ............ 29/25.42; 361/311, 312, 361/313, 320, 321; 357/51; 430/319

[56] References Cited

U.S. PATENT DOCUMENTS

| | | | |
|---|---|---|---|
| 3,432,918 | 3/1969 | Riley et al. | 357/51 X |
| 3,864,817 | 2/1975 | Lapham et al. | 357/51 X |
| 4,481,283 | 11/1984 | Kerr et al. | 357/51 X |
| 4,571,816 | 2/1986 | Dingwall | 357/51 X |

Primary Examiner—Donald A. Griffin
Attorney, Agent, or Firm—Kirschstein, Ottinger, Israel & Schiffmiller

[57] ABSTRACT

A method of forming a plurality of MIM capacitors is provided in which one of the metal layers constitutes a plurality of electrodes and a plurality of beam- leads. Each beam- lead is contiguous with the dielectric layer and the substrate. Preferably the substrate is transparent so as to facilitate the separation of the capacitors.

6 Claims, 2 Drawing Sheets

CAPACITORS

BACKGROUND OF THE INVENTION

1. Field of the Invention

This invention relates to capacitors and, in particular, to capacitors in which connections to the device are made by way of one or more beam leads.

2. Description of Related Art

Conventional beam lead capacitors are made by depositing a dielectric layer of silicon dioxide and silicon nitride onto a n+-type silicon wafer. The beam leads are connected to the dielectric layer via ohmic contacts to form a metal-insulator-semiconductor capacitor in which the semiconductor acts as one of the capacitor electrodes. The electrical performance of these capacitors is impaired by losses in the silicon wafer and in the ohmic contacts. In addition to this, because of depletion in the silicon wafer, the capacitance varies with the bias levels of the device.

In such devices a conflict arises between the need to fix the beam leads securely and the need for stray impedances, especially capacitance attributable to the beam leads to be kept to a minimum.

SUMMARY OF THE INVENTION

It is an object of the present invention to provide a capacitor wherein these problems are alleviated.

According to one aspect of the present invention, there is provided a capacitor mounted on a substantially loss-less substrate and comprising a first metallic electrode layer contiguous with said substrate, a dielectric layer formed over said first layer and a second metallic electrode layer forming at least one beam-lead contiguous with said dielectric layer and said substrate.

Preferably said substrate is formed from a transparent or translucent material such as glass or quartz. The substrate may alternatively be formed from alumina.

According to another aspect of the invention, a method of manufacturing a plurality of beam lead capacitors comprises the steps of forming a plurality of localised first electrodes as a metal layer on a substrate of substantially loss-less material; depositing dielectric material onto said first electrodes; forming a further metal layer over the dielectric material and the substrate such that said further metal layer constitutes a plurality of second electrodes and a plurality of pairs of beam leads, the inner end of one of each pair of beam leads being electrically connected to a said first electrode, and the inner end of the other of each pair of beam leads being electrically connected to a said second electrode; removing part of the thickness of the substrate underlying the outer ends of the beam leads to leave thin connecting regions of substrate; and etching through said thin regions to leave a plurality of separate capacitors each with a pair of projecting beam leads.

The metals used for the layers may be chromium and gold; optionally, a layer of platinum may be formed between the gold and chromium layers. Preferably the dielectric material is silicon dioxide or silicon nitride.

Part of the thickness of the substrate underlying the outer ends of the beam-leads may be removed by the mechanical action of an abrasive instrument, such as a diamond saw. This is facilitated if the substrate is formed from a transparent material, allowing visual alignment and positioning.

BRIEF DESCRIPTION OF THE DRAWINGS

By way of example only, a method of manufacturing capacitors in accordance with the invention will now be described with reference to FIGS. 1 to 7 showing various steps in manufacturing the capacitor.

DETAILED DESCRIPTION OF THE PREFERRED EMBODIMENTS

Figure 1:
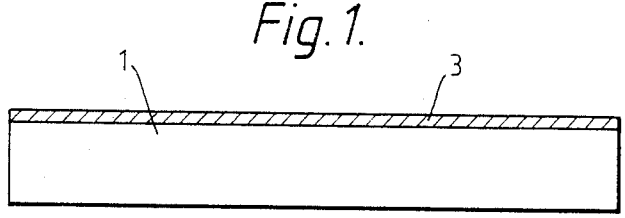
Figure 2:
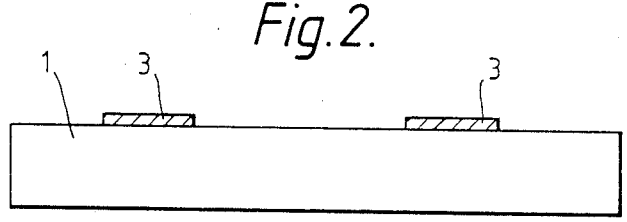
Figure 3:
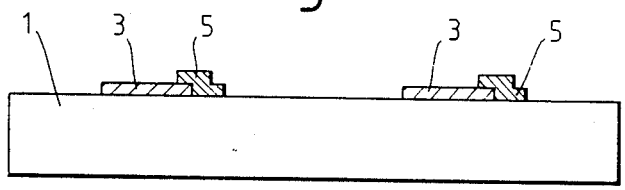
Figure 4:
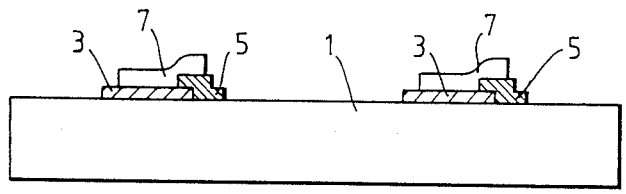
Figure 5:
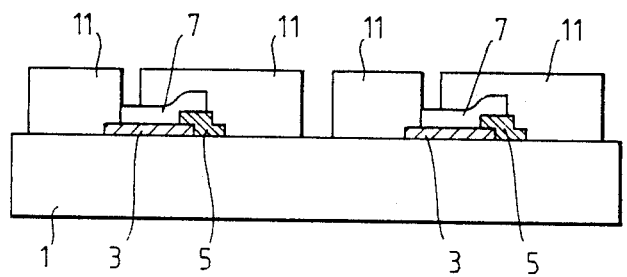
Figure 6:
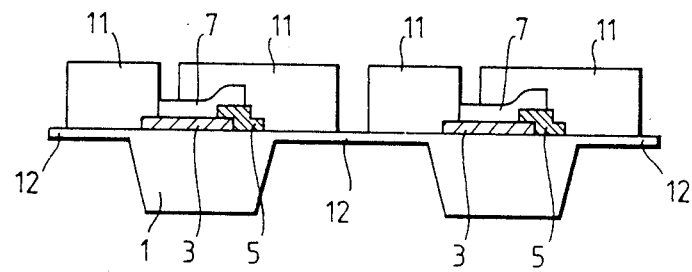
Figure 7:
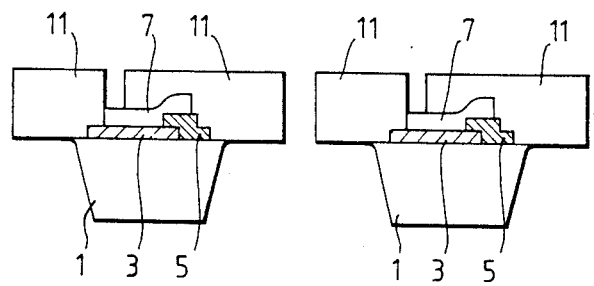

Layers of chromium and gold, each of a thickness of 1 μm are sputter deposited onto a glass substrate 1 which is approximately 500 μm thick (FIG. 1, not to scale). This thick substrate provides a strong mount for the capacitor. Then, as shown in FIG. 2 the metal layer 3 is etched to form discrete regions which constitute one set of capacitor electrodes. Silicon dioxide 5 is then deposited onto one edge of the discrete regions at a temperature of 350° C. to partially cover the discrete region 3 and the adjacent area of the substrate to a depth of ·3 μm (FIG. 3). The silicon dioxide is then defined. FIG. 4 shows a ·2 μm layer 7 of silicon nitride vapour deposited at 350° C. onto the discrete regions 3 so that it also covers part of the silicon dioxide layer 5. The silicon nitride serves as the dielectric material for the capacitor. Further layers 11 of chromium and gold are evaporated over the previously deposited layers and the substrate 1. Parts of these further layers 11 are selectively removed by etching to expose parts of the substrate 1 and the silicon nitride layer 7 (FIG. 5) to leave localised regions of the layer 11 which constitute the other set of capacitor electrodes. Gold (FIG. 6) plated over those parts of the further layers 11 which remain, to a thickness of 15 μm to form relatively robust beam-leads by means of which individual capacitors (FIG. 7) can eventually be mounted in a circuit. It will be seen that the purpose of the layer 5 is to prevent electrical short circuits occurring between the two electrodes of each capacitor.

The glass substrate 1 is then thinned to a width of approximately 125 μm by etching with 40% hydrofluoric acid. Alternatively the substrate 1 may be lapped in a water slurry of carborundum powder before it is etched. Excess material directly below the exposed region of the substrate 1 is removed using a diamond saw leaving a thin connecting substrate whose thickness is in the region of 25 μm. To separate the adjacent discrete regions, an etching process is used to remove the thin connecting substrate.

Since the substrate is transparent, the saw can be positioned visually. The use of the saw to remove the bulk of the glass substrate, between adjacent capacitors, enables the substrate to be readily divided in a practical manner as it is difficult to wet etch glass to any appreciable extent. However the saw would damage the relatively soft layers 11, were it to come into contact, so the thin remaining portions 12 are removed using a wet etch process. A large two dimensional array of capacitors can be fabricated simultaneously on a glass substrate, the saw being arranged to cut in rows and columns to facilitate separation of the individual capacitors.

I claim:

1. A method of manufacturing a plurality of beam-lead capacitors comprising the steps of forming a plurality of thereupon first electrodes as a metal layer on a substrate of substantially loss-less material; depositing dielectric material onto said first electrodes; forming a further metal layer over the dielectric material and the substrate such that said further metal layer constitutes a plurality of second electrodes and a plurality of pairs of beam-leads, the inner end of one of each pair of beam-leads being electrically connected to a said first electrode, and the inner end of the other of each pair of beam-leads being electrically connected to a said second electrode; removing part of the thickness of the substrate underlying the outer ends of the beam-leads to leave thin connecting regions of substrate; and thereupon etching through said thin regions to leave a plurality of separate capacitors, each with a pair of projecting beam-leads.

2. A method of manufacturing a plurality of beam-lead capacitors as claimed in claim 1 wherein the step of forming at least one of the metal layers is performed by using layers of chromium and gold.

3. A method of manufacturing a plurality of beam-lead capacitors as claimed in claim 2 wherein the forming step includes forming a layer of platinum between said layers of chromium and gold.

4. A method of manufacturing a plurality of beam-lead capacitors as claimed in claim 1 wherein the step of depositing said dielectric material is performed by using silicon dioxide or silicon nitride.

5. A method of manufacturing a plurality of beam-lead capacitors as claimed in claim 1 wherein the step of forming includes using transparent material for said substrate.

6. A method of manufacturing a plurality of beam-lead capacitors as claimed in claim 1 wherein the step of removing the part of the substrate underlying the outer ends of the beam-leads is performed by the mechanical action of an abrasive instrument.

* * * * *